July 8, 1924.
D. G. LEONARD
FRUIT PICKER
Filed Nov. 21, 1922
1,501,007
2 Sheets-Sheet 1
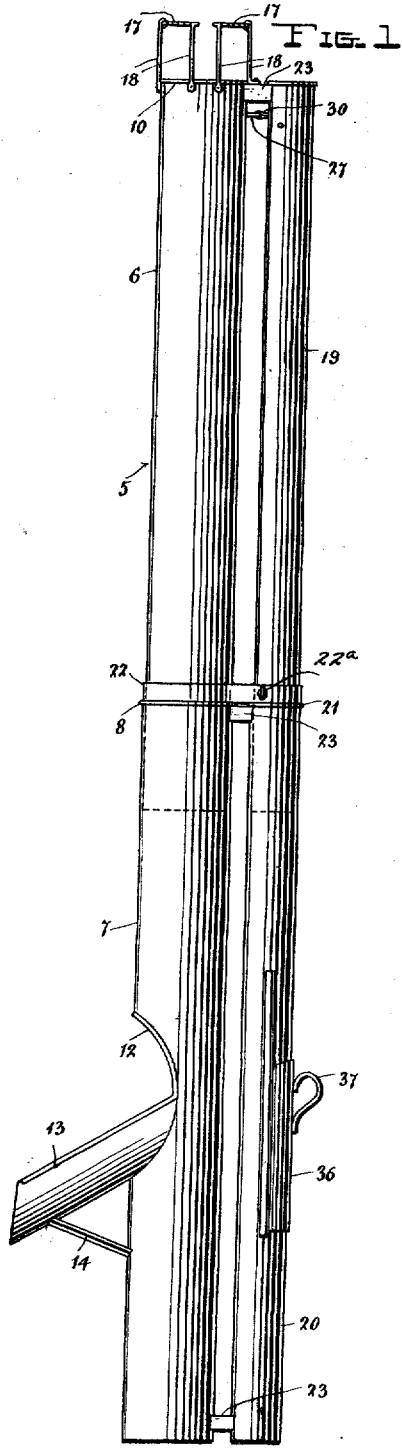
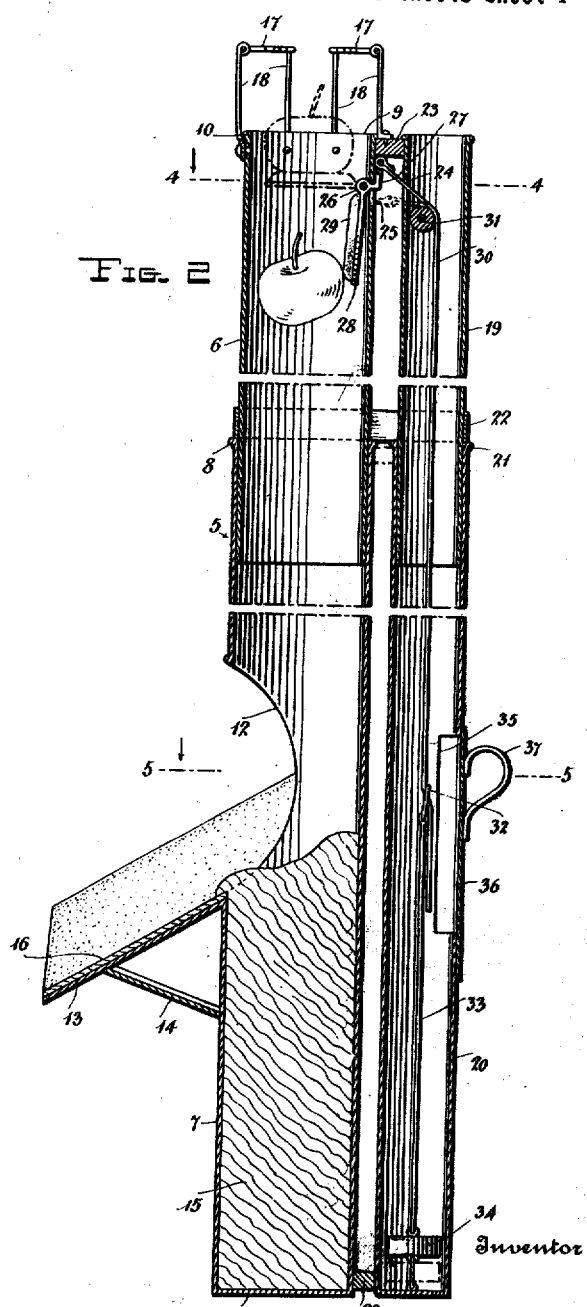
Inventor
David G. Leonard,
By
Attorney July 8, 1924.

D. G. LEONARD 1,501,007

FRUIT PICKER

Filed Nov. 21, 1922

Inventor
David G. Leonard,

By
Attorney

Patented July 8, 1924.

1,501,007

UNITED STATES PATENT OFFICE.

DAVID G. LEONARD, OF SCHAGHTICOKE, NEW YORK.

FRUIT PICKER.

Application filed November 21, 1922. Serial No. 602,400.

*To all whom it may concern:*

Be it known that I, DAVID G. LEONARD, a citizen of the United States, residing at Schaghticoke, in the county of Rensselaer and State of New York, have invented certain new and useful Improvements in Fruit Pickers, of which the following is a specification.

This invention relates to fruit pickers, and the primary object of the same is to provide a device of this character which may be easily operated in gathering fruit, and particularly apples, from the branches of trees and convey the separated fruit through the picker to a point of delivery without bruising or otherwise injuring the fruit while the operator stands on the ground, the improved fruit packer being adjustable to various lengths to accommodate the height of the fruit from the ground surface. A further object of the invention is to provide a fruit picker having automatically operating means therein to receive the separated fruit and release the same for discharge through the improved picker to a point adjacent to the ground surface, with the same preservation of fruit that ensues when hand-picking the same directly from the trees. A still further object of the invention is to generally improve fruit pickers and render them structurally convenient, both in practically operating the same at various heights and during transportation and storage, and also to embody in devices of this character a comparatively simple construction having a positive operation.

With these and other objects and advantages in view, the invention consists in the construction and arrangement of the several parts which will be more fully hereinafter described and claimed.

In the drawings:

Fig. 1 is a side elevation of a fruit picker embodying the features of the invention;

Fig. 2 is a vertical section taken through the center of the improved fruit picker and shown on a larger scale than illustrated by Fig. 1, the fruit picker in Fig. 2 being broken through at several points;

Figure 3:
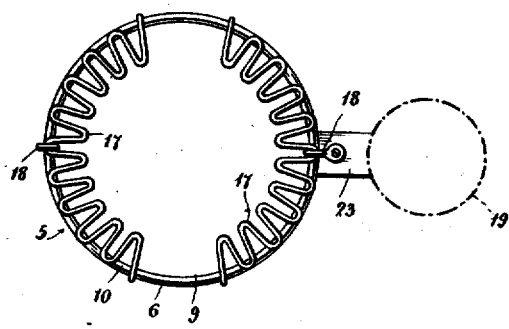
Fig. 3 is a top plan view of the improved picker.

The improved picker comprises as a whole a gathering tube or tubular body 5 composed of telescopic sections 6 and 7, the section 6 being of less diameter than the section 7 and movable into the latter and outwardly therefrom to shorten or lengthen the improved device. The upper edge of the section 7 is beaded, as at 8, to give freedom of movement of the section 6 thereinto. The upper end 9 of the section 6 is fully open and is beaded, as at 10, so as to remove any sharp edge at this point, and the bottom 11 of the section 7 is fully closed. The section 7 at a suitable elevation above the bottom 11 is formed with a discharge opening 12 having a downwardly inclined discharge spout 13 mounted to register with the lower portion of the wall of said opening and held by a brace 14 between the same and the adjacent portion of the section 7. From a point slightly above the lowermost portion of the wall of the opening 12 and fully to the closed bottom 11 of the section 7 a cushion or cushion filling 15 is disposed and serves to provide a soft bed upon which the fruit is adapted to drop and roll outwardly into the spout 13, the latter having a lining 16 of soft material over which the gathered fruit has movement. Fixed to the upper end of the section 6 above the inlet or fully open end 9 thereof are corrugated gatherers 17 consisting of horizontally disposed wires which are shaped as shown in plan view by Fig. 3, these gatherers 17 being preferably semi-circular and rigidly supported in connection with the upper end of the gatherer by uprights or braces 18 at the inner and outer portions of the said gatherers. Preferably the gatherers 17 are separated, so as to facilitate application thereof to the fruit hanging from the branches and other parts of the trees.

Figure 4:
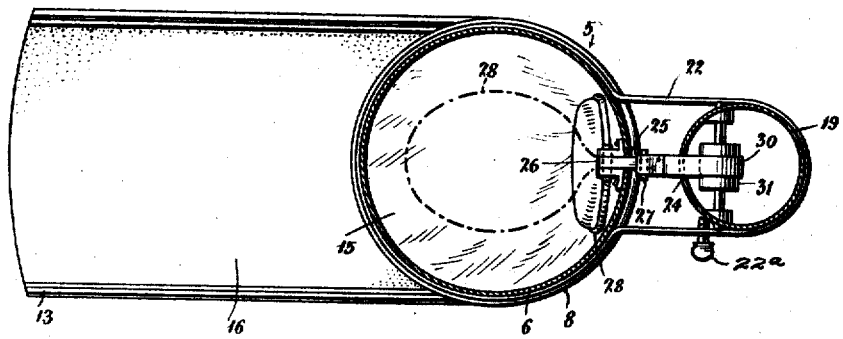
Fig. 4 is a horizontal section taken on the line 4—4, Fig. 2.
Figure 5:
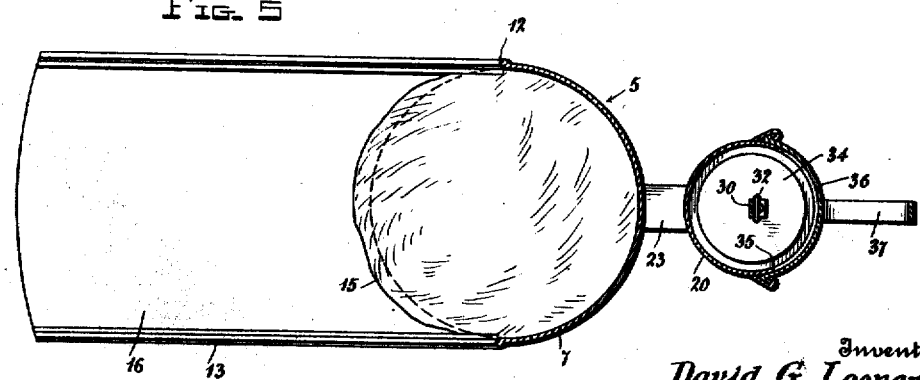
Fig. 5 is a horizontal section taken on the line 5—5, Fig. 2.

Connected to and running parallel with the tubular gatherer or tubular body 5 and extending full length of the latter and spaced therefrom is a tubular member for enclosure of a part of the working mechanism, said tubular member comprising upper and lower telescopic sections 19 and 20, the section 19 being of less diameter than the section 20 and movable into the latter. The upper end of the section 20 is open and beaded, as at 21, and is disposed in the same horizontal plane as the upper open beaded end of the section 7 of the gathering tube or tubular body 5, and surrounding the sections 6 and 19 is a stop band or collar 22 which serves to fix these two sections for unitary adjustment, so that the adjustment of one will be equal under all conditions to the adjustment of the other. The band or collar 22 is provided with a set or clamping screw 22ª, as shown by Figs. 1 and 4, for the purpose of binding against the upper telescopic section 19 to maintain the adjustable sections in fixed adjustment, or against loose movement and accidental displacement. The collar or band 22 may also serve as a stop means to limit the movement of the sections 6 and 19 into their respective sections 7 and 20, said collar or band under these conditions striking the upper beaded open ends of the latter sections. Between the upper ends of the sections 6 and 9 and the lower ends of the sections 7 and 20, connecting members 23 are interposed, to maintain the tubular gatherer or tubular body 5 and the tubular enclosure for a part of the mechanism in rigid associated spaced relation. At the inner portion of the upper extremity of the section 19 an opening 24 is formed, and opposite this opening an opening 25 is also provided in the adjacent portion of the upper extremity of the section 6 of the tubular gatherer. Adjacent to the opening 25 a bell crank lever 26 is pivotally mounted and has a short angular arm 27 movably projecting through the said opening 25 and operable in the space between the sections 6 and 9. Continuous with the short angular arm 27 is an elongated supporting plate 28 forming a part of the bell crank lever 25 and having fixed thereon a cushioning pad 29. The plate 28 with the pad 29 is located within the section 6 and in its normal position is disposed horizontally and centrally with relation to the upper inlet opening 9 of the section 6, as indicated by dotted lines in Fig. 2. The dimensions of the plate 28 and pad 29 are such as to insure retention thereon of the individual fruit separated from the tree and also to insure unrestricted action or operation of the plate and its pad, the latter serving as a hinged receiving support. To the outer free end of the angular arm 27 of the complete bell crank lever 25 a strap 30 is attached and is freely movable through the opening 24 in the section 19 and also downwardly over a guide roller 31 mounted in the section 19 at a short distance below the lower wall of the opening 24. The strap or analogous device 30 extends downwardly through the telescopic sections 19 and 20 and is adjustably connected by a buckle or similar device 32 to a lower section 33 of the strap, the section 33 having a weight 34 secured to its lower end. The weight 34 is heavy enough to overcome the resistance of the plate 28 with its cushion 29 and to normally hold the said plate in horizontal position, but when an apple or other fruit falls onto and engages the pad 29 and plate 28, the resistance of the weight 34 is overcome and the plate and its pad tilt to the position shown by full lines in Fig. 2 and the fruit falls to the cushion filling or cushion 15 and thence passes out through the discharge spout 13. When the weight of the fruit is relieved from the plate 28 and pad 29, the latter parts are immediately restored to normal position through the action of the weight 34. The strap or analogous device 30 is adjustably connected to the section 33 thereof to accommodate lengthening and shortening of the fruit picker as a whole, and to render the adjusting buckle or other device 32 accessible the section 20 adjacent to the buckle or device 32 is formed with an opening 35 which is normally closed by a flanged cover 36 having a handle 37. At any time found necessary the cover 36 may be detached and the adjustment desired easily made.

From the foregoing the operation of the improved fruit picker will be understood, but briefly, the necessary adjustment of the telescopic parts is first made or effected as found necessary to reach the fruit to be gathered and the operator then applies either one of the corrugated gatherers 17 to an individual apple or other fruit and by a slight pulling action separates the same from the branch carrying the apple, and, when released, the fruit falls upon the pad 29 and plate 28 and the latter tilts, permitting the fruit to fall below and strike the cushion or cushion filling 15 and thence roll out over the latter through the discharge spout 13 into a bag or other receptacle that may be applied to the spout, without the least injury to the fruit. By this means fruit may be rapidly gathered at various elevations from the ground surface.

It is obvious that changes in the minor details of construction and proportions of the several parts may be adopted without in the least departing from the spirit of the invention or scope of the appended claims.

What is claimed as new is:

1. A fruit picker consisting of a telescopic tube having a cushioning means filling the lower portion thereof and an outlet adjacent the upper termination of the cushioning means, a gathering device at the upper end of the tube, a hinged tilting receiver in the upper end of the tube below the gathering device and normally positioned horizontally with relation to the said upper end of the tube, enclosing means extending along the said telescopic tube, and means gravitatingly and freely movable in the said enclosing means and connected to the tilting receiver for normally holding the latter in a horizontal position.

2. A fruit picker consisting of a telescopic gathering tube having a lower outlet and cushioning means adjacent to the outlet, gathering means above the upper open end of the tube, a telescopic tube of less diameter than and connected to the gathering tube for uniformity of adjustment, a tilting receiver mounted in the upper extremity of the gathering tube and having a cushioning means, and a weight freely movable in the smaller telescopic tube and connected to the tilting receiver to normally hold the latter in horizontal position but overcome by the weight of the fruit on the receiver to permit passage of the fruit through and discharge thereof outwardly from the gathering tube.

3. A fruit picker consisting of telescopic tubes adjacently located and spaced one from the other, the one tube being of less diameter than the other and the larger tube serving as a means for permitting the passage of the gathered fruit therethrough and discharge outwardly therefrom, the larger tube having gathering means on the upper end thereof and a tilting receiver below the gathering means and movable therein, and a strap connected to the tilting receiver and movable downwardly through the tube of smaller diameter and having a weight attached to the lower end thereof, the said strap being adjustable to compensate for adjustment of the telescopic tubes.

4. A fruit picker consisting of telescopic tubes adjacently located and spaced one from the other, the one tube being of less diameter than the other and the larger tube serving as a means for permitting the passage of the gathered fruit therethrough and discharge outwardly therefrom, the larger tube having gathering means on the upper end thereof and a tilting receiver below the gathering means and movable therein, and a strap connected to the tilting receiver and movable downwardly through the tube of smaller diameter and having a weight attached to the lower end thereof, the said strap being adjustable to compensate for adjustment of the telescopic tubes, the smaller tube having an opening through the lower portion thereof and provided with a removable cover to render the strap accessible for adjusting purposes.

In testimony whereof I affix my signature.

DAVID G. LEONARD.

Witnesses:
 FORREST V. ECHART,
 ALEX DWER.